May 26, 1953     F. D. PEEL     2,639,748
GRATER

Filed March 27, 1950                                       2 Sheets-Sheet 1

Francis D. Peel
INVENTOR.

BY *Clarence A. O'Brien and Harvey B. Jacobson*
Attorneys

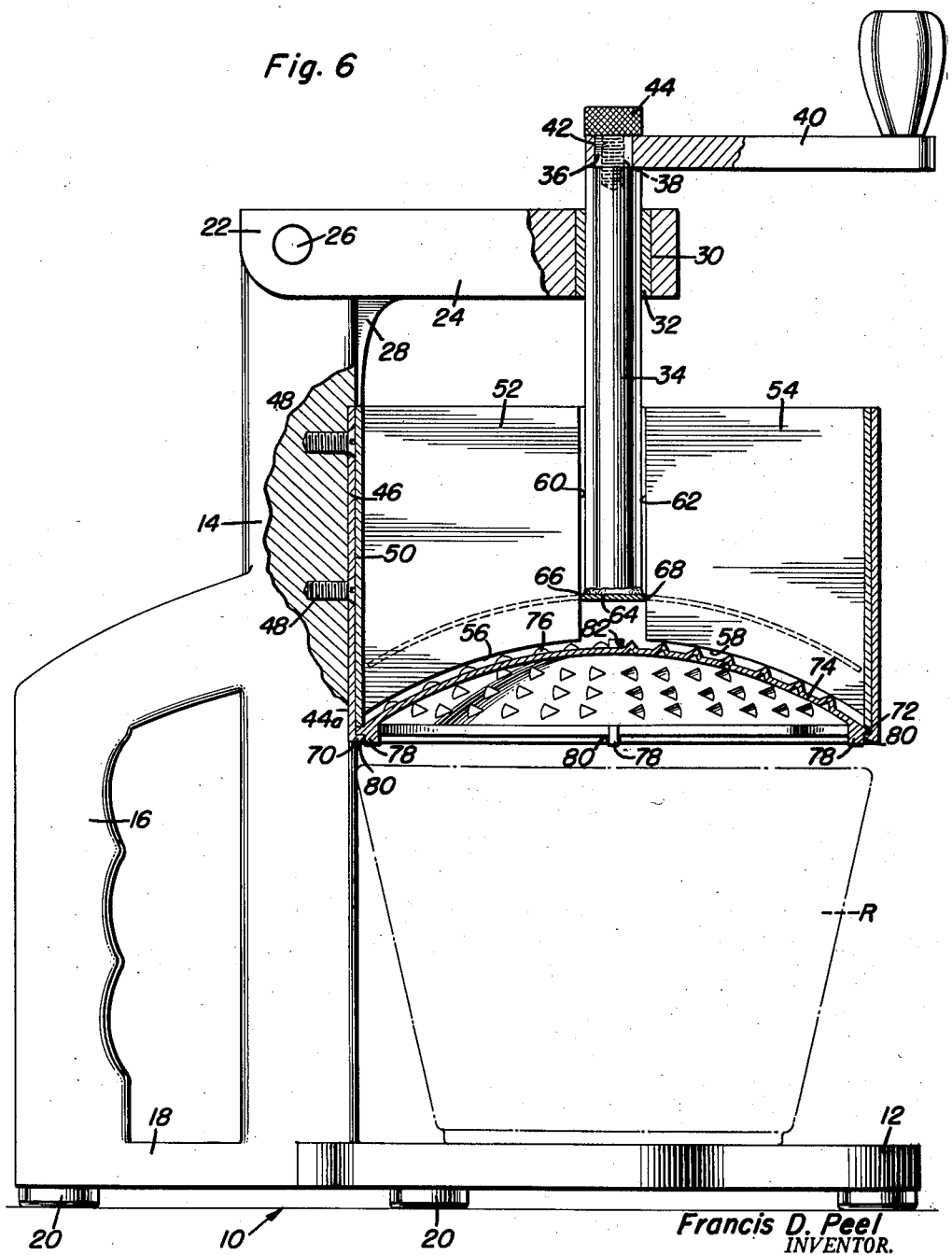

Patented May 26, 1953

2,639,748

UNITED STATES PATENT OFFICE 2,639,748

GRATER

Francis D. Peel, Greenville, N. C.

Application March 27, 1950, Serial No. 152,173

5 Claims. (Cl. 146—177)

1

This invention relates to new and useful improvements in kitchen apparatus and the primary object of the present invention is to provide a combination grater and juicer whereby the juice may be removed from fruit and/or fruit and vegetables may be grated in a convenient manner.

Another important object of the present invention is to provide a combination grater and juicer, the parts of which are quickly and readily assembled or disassembled for cleaning or repair.

Yet another object of the present invention is to provide a combination grater and juicer including a support and a combined handle and stabilizer or anti-tipping member carried by the support.

Another object of the present invention is to provide a combination grater and juicer including a sleeve having a grater member mounted in the sleeve and a rotatable and slidable pressure member for urging and rotating an object against the grater member.

A further object of the present invention is to provide a combination grater and juicer that is extremely easy to operate for the grating and squeezing of food stuff in a safe manner.

A still further aim of the present invention is to provide a combined grater and juicer that is simple and practical in construction, strong and reliable in use, small and compact in structure, inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
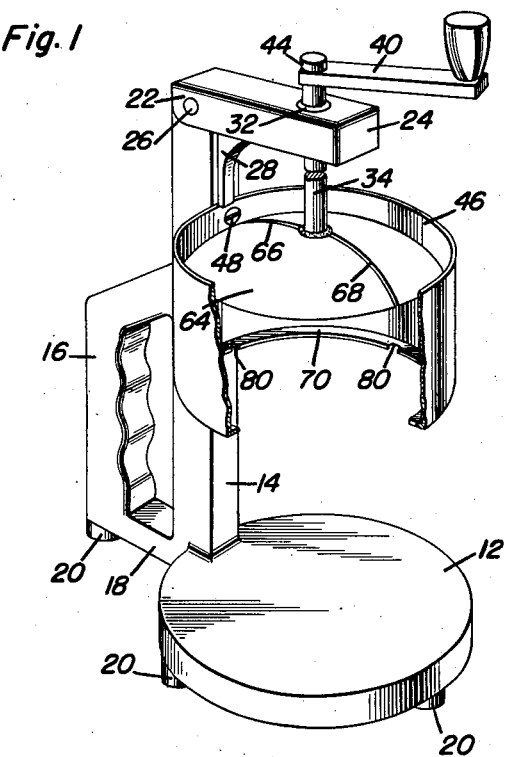
Figure 1 is a perspective view of the present invention with parts removed therefrom and with parts broken away.
Figure 2:
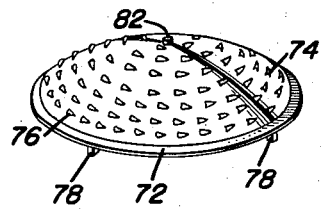
Figure 2 is a perspective view of the grater used in conjunction with the present invention.
Figure 4:
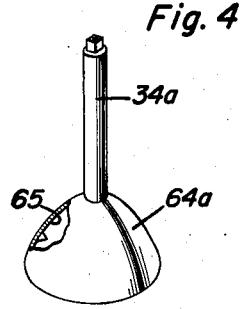
Figure 4 is a perspective view of one of the pressure members used in the present invention, and with parts broken away.
Figure 3:
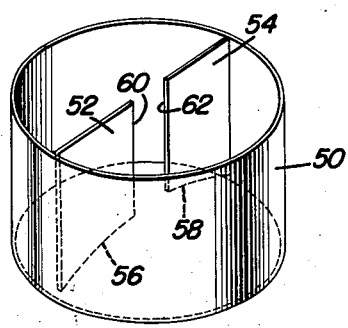
Figure 3 is a perspective view of the whirling cylinder used in the present invention.
Figure 5:
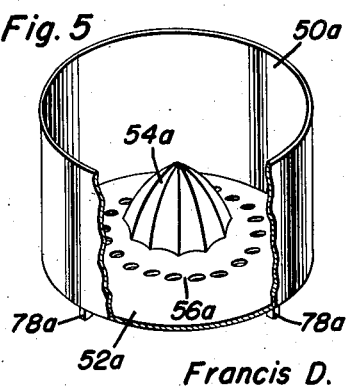
Figure 5 is a perspective view of the fruit rubbing member used in the present invention; and, Figure 6 is an elevational view of the present invention assembled for use as a grater and with parts broken away and shown in section.

Referring now to the drawings in detail, wherein for the purpose of illustration, there is disclosed a preferred embodiment of the present invention, the numeral 10 designates a support including a base 12 and an upright or post 14

2 rising from one edge of the base or mounted eccentrically of the base.

Means is provided for stabilizing the support and for permitting the support to be handled in a comfortable manner. This means comprises a hand grip 16 that is integrally formed with the upright and which is joined to the base by a plate 18 integrally formed with both the hand grip and the base. The lower face of the plate 18 is flush with the undersurface of the base 12. Resilient pads 20 are secured to the undersides of the base 12 and the plate 18 to prevent marring of a surface supporting the device and to prevent sliding of the device upon a supporting surface.

The bifurcated end 22 of a supporting arm 24 receives the upper end of the upright 14 and is pivoted to the upper end of the upright for vertical swinging movement by a horizontal pivot 26. The arm 24 is supported in a horizontal position by a vertical rib or abutment 28 on the upright.

The arm 24 is provided with a transverse aperture 30 in which there is fitted a bearing collar 32. A rod or shaft 34 is slidably and rotatably positioned in the collar 32 and includes a reduced multi-sided end portion 36 having a threaded recess 38. A crank handle 40 is formed with a multi-sided opening 42 that receives the end portion 36. A bolt 44 threaded in the recess 38 retains the handle 40 on the end portion 36.

A vertical notch 44a is provided in the upright and receives a vertically disposed sleeve or casing 46 that is detachably secured to the upright by fasteners 48 that extend through the sleeve 46 and enter threaded apertures in the upright.

A hollow cylinder 50 is mounted for rotation in the sleeve 46 and also slides within the sleeve 46. A pair of diametrically opposed radial plates or fins 52 and 54 are fixed within the cylinder 50 and include concave lower edges 56 and 58 respectively. The inner parallel vertical edges 60 and 62 of the plates 52 and 54 are spaced apart a distance slightly greater than the diameter of the rod 34 to permit the rod 34 to slide between the plates 52 and 54 without obstruction.

The central portion of a concave-convexed pressure member 64 is suitably fixed to the lower end of the rod 34 and includes a pair of diametrically opposed radial slots 66 and 68. The member 64 is received within the cylinder 50 and when the member 64 is raised to clear the cylinder, the arm 24 may be raised about the pivot 26 for access to the cylinder or sleeve.

The sleeve 46 is provided with an inturned flange 70 at its lower end that supports the flanged portion 72 of a concave-convexed grater member 74 having a plurality of outwardly projecting teats or lugs 76 on its convex surface. A plurality of circumferentially spaced lugs or keys 78 depend from the flanged portion 72 and enter a plurality of circumferentially spaced notches 80 in the flange 70 to hold the grater member against rotation in the sleeve 46.

A stop lug 82 rises from the grater member 74 in longitudinal alignment with the rod 34 to engage the member 64 and prevent the member 64 from riding against the grating lugs 76.

In practical use of the present invention, the arm 24 is raised about its pivot 26 and the cylinder 50 is removed from the sleeve 46.

The cylinder 50 is inserted in the sleeve 46 and the arm 24 is lowered so that the plates 52 and 54 enter the slots 66 and 68. Then, the object to be grated is placed within the cylinder 50.

As the shaft 34 is rotated, the cylinder 50 will whirl and the member 64 may be lowered against the object being rotated against the roughened surface of the member 74 to enter a receptacle R disposed on the base 12 beneath the sleeve 46, it being understood that the lugs 76 are provided with openings having sharpened edges, as is conventional for such grating lugs.

When the present invention is used for squeezing fruit and the like, the rod 34 and the pressure member 64 are replaced by another rod 34a and a hollow substantially conical pressure member 64a is secured at its minor end to the lower end of the rod 34a. Projections 65 on the inner periphery of the member 64a will penetrate a fruit received in the member 64a.

Also, the cylinder 50 and the grater member 74 are replaced by another cylinder 50a having a closed lower end 52a from which there rises a member 54a having a roughened or fluted surface. A group of circumferentially spaced apertures 56a are provided in the lower wall of the cylinder 50a about the member 54a to permit juice to pass from the cylinder 50a.

A plurality of circumferentially spaced lugs 78a depend from the lower end of the cylinder 50a for entering the notches 80 in the flange 70 on which the cylinder 50a is supported.

As a fruit held in the member 64a is rotated and moved downwardly against the member 54a, the rubbing action will effect a dispensing of juice through the apertures 56a.

It should be noted that the rib 28 in addition to providing a support for the arm 24 also keeps sleeve 50 in proper position by keeping the bottom of sleeve 50 against member 74.

In view of the foregoing description taken in conjunction with the accompanying drawings it it believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A grater comprising a support, a vertically disposed sleeve mounted on said support and having an inturned lower horizontal flange, a grating member retained in said sleeve and having a peripheral flange resting upon the flange of the sleeve, interlocking means between said member and said sleeve holding the member against rotation in the sleeve, a vertically slidable and rotatable rod carried by said support exteriorly of the sleeve, a pressure member secured to the lower end of said rod, a hollow cylinder journaled for rotation in said sleeve and having a lower end engaging the peripheral flange of the grating member, said pressure member being positioned in said cylinder, and means carried by said cylinder slidably receiving said pressure member and holding the cylinder to the pressure member for rotation of the cylinder in the sleeve during rotation of the rod.

2. The combination of claim 1 wherein said means includes a pair of diametrically opposed radial plates fixed within said cylinder, said pressure member having a pair of diametrically opposed radial slots slidably receiving said plates.

3. A grater comprising a base plate, an upright rising from the base plate, an arm pivoted to the upper end of said upright, a rib at the upper end of the upright and engaging and supporting the arm in a horizontal position, a rod journaled for rotation on said arm and also slidably carried by said arm, a vertically disposed sleeve mounted secured to said upright and overlying said base and underlying the arm, a grater member detachably mounted in said sleeve and held against rotation in the sleeve, a hollow cylinder rotatable and slidable in said sleeve, a pair of radially disposed vertical plates fixed in said cylinder, and a pressure plate fixed on said rod for rotation with the rod and movable with the rod toward the grater member, said pressure plate having a pair of radial slots slidably receiving said radial plates to permit rotation of the cylinder with the rod and sliding movement of the rod relative to the cylinder.

4. The combination of claim 3 wherein said grater member includes a concave-convexed member having upstanding teats on its convex surface, and a stop lug rising from said grater member to engage the pressure plate and limit sliding movement of the pressure member toward the grater member.

5. The combination of claim 3 wherein said sleeve includes an inturned flange having a plurality of circumferentially spaced notches, said grater member having a flanged portion seated on said inturned flange, and a plurality of circumferentially spaced lugs depending from the flanged portion of said grater member and received in said notches, said cylinder including a lower edge resting upon the flanged portion of said grater member.

FRANCIS D. PEEL.

References Cited in the file of this patent

UNITED STATES PATENTS

| Number | Name | Date |
| --- | --- | --- |
| 2,099,170 | Majewski, Jr. | Nov. 16, 1937 |
| 2,144,390 | Rupert et al. | Jan. 17, 1939 |
| 2,406,479 | Stahly | Aug. 27, 1946 |
| 2,414,075 | Walker | Jan. 7, 1947 |
| 2,443,129 | Binzel | June 8, 1948 |
| 2,496,780 | Nardis et al. | Feb. 7, 1950 |
| 2,497,335 | Wissner | Feb. 14, 1950 |

FOREIGN PATENTS

| Number | Country | Date |
| --- | --- | --- |
| 365,283 | Great Britain | Jan. 21, 1932 |